United States Patent [19]

Quinn

[11] Patent Number: 4,629,753
[45] Date of Patent: Dec. 16, 1986

[54] WATER DISPERSED RUST INHIBITIVE COATING COMPOSITIONS

[75] Inventor: Robert E. Quinn, Cleveland, Ohio

[73] Assignee: The Lubrizol Corporation, Wickliffe, Ohio

[21] Appl. No.: 801,641

[22] Filed: Nov. 25, 1985

Related U.S. Application Data

[63] Continuation-in-part of Ser. No. 578,303, Feb. 9, 1984, abandoned.

[51] Int. Cl.[4] .................. C08K 3/26; C08K 3/30; C08K 5/04; C08K 5/09
[52] U.S. Cl. .................. 524/394; 427/388.4; 524/400; 524/420; 524/425; 524/436
[58] Field of Search .............. 427/388.4; 524/394, 524/400, 420, 425, 436

[56] References Cited

U.S. PATENT DOCUMENTS

| | | | |
|---|---|---|---|
| 3,242,079 | 3/1966 | McMillen | 252/33 |
| 3,384,586 | 5/1968 | McMillen | 252/33 |
| 3,453,124 | 7/1969 | Wurstner | 106/14 |
| 3,492,231 | 1/1970 | McMillen | 252/33 |
| 4,161,566 | 7/1979 | Higgins | 428/454 |
| 4,230,586 | 10/1980 | Bretz | 252/8.5 |
| 4,264,363 | 4/1981 | Cech | 106/14.28 |

*Primary Examiner*—Michael R. Lusignan
*Attorney, Agent, or Firm*—Denis A. Polyn; Forrest L. Collins; Karl Bozicevic

[57] ABSTRACT

This invention relates to non-asphaltic, non-mastic type, water dispersed rust inhibitive coating compositions comprising in admixture a film forming organic polymer and a non-Newtonian colloidal disperse system comprising (1) solid metal containing colloidal particles, (2) a liquid dispersing medium and (3) an organic compound the molecules of which contain a hydrophobic portion and at least one polar substituent.

65 Claims, No Drawings

WATER DISPERSED RUST INHIBITIVE COATING COMPOSITIONS

This application is a continuation-in-part application of application, U.S. Ser. No. 578,303, filed on Feb. 9, 1984, now abandoned.

FIELD OF THE INVENTION

This invention relates to water dispersed coating compositions capable of irreversibly forming hardened, corrosion inhibitive coatings or films. More particularly, this invention relates to protective non-asphaltic, non-mastic type water dispersed film forming compositions comprising in intimate admixture, a film forming organic polymer and a non-Newtonian colloid disperse system Articles of manufactures wherein metallic surfaces are coated with such film forming compositions also form a part of this invention.

BACKGROUND OF THE INVENTION

The corrosion of metal surfaces is of obvious economic significance in many industrial applications and, as a consequence, the inhibition of corrosion is a matter of prime consideration. It is of particular significance to users of steel and other ferrous alloys. The corrosion of such ferrous metal alloys is largely a matter of rust formation which in turn involves the overall conversion of the free metal to its oxides.

The theory which best explains such oxidation of ferrous metal articles postulates the essential presence of both water and oxygen. Even minute traces of moisture are sufficient, according to this theory, to induce dissolution of the iron therein and the formation of ferrous oxide until the water becomes saturated with ferrous ions. The presence of oxygen causes oxidation of the resulting ferric hydroxide which settles out of solution and is ultimately converted to ferric oxide or rust.

The above sequence of reactions can be prevented or at least to a large measure inhibited, by relative impermeable coatings or films which have the effect of excluding moisture and/or oxygen from contact with the metal surface. Such coatings are often exposed to high humidity, corrosive atmosphere, etc., and to the extent that these coatings or films are penetrated or otherwise harmed by such influences they become ineffective for the desired purpose. It is also important that such coatings adhere tightly to the metal surface and resist flaking, crazing, blistering, powdering and other forms of loss of adhesion. A satisfactory corrosion-proofing coating or film then, must have the ability to resist weathering, high humidity, and corrosive atmospheres such as salt-laden mist or fogs, air contaminated with industrial wastes, road dirt, calcium chloride, etc., so that the protective coating or film is maintained on most, if not all, of the metal surface.

The corrosion of metal surfaces is of particular economic concern to owners and manufacturers of automotive vehicles. For instance, every car owner is aware of the corrosion which begins on the inner or underside of automobile bodies such as inside rocker panels, fender wells, headlight assemblies and door panels. The corrosive rate is especially high in certain geographic areas which are subjected to severe weather during the winter months necessitating the use of sand, salt, calcium chloride, cinders, etc., to maintain roads in usable condition. Under these conditions, it generally is only a matter of time before the relatively light gauge automotive body steel is completely converted to ferric oxide or rust. When this point is reached, the high quality exterior finishes flake off and reveal the metal destruction which has occurred to the body of the vehicle.

Automotive manufacturers have waged a constant battle against such body corrosion. Mastics and sealers have been used extensively as physical barriers to corrosive agents, and corrosion inhibiting primers have been used on underbody surfaces when they do not interfere with production line welding operations. When possible, zinc coated galvanized steel is used in substantial amounts to produce many body components directly exposed to corrosive agents. These efforts and many others, however, have only reduced underbody corrosion problems; the problem remains. The asphaltic mastic undercoatings failed to give the desired permanent protection against corrosion since on hardening due to age, these coatings would crack and lose adhesion, especially when exposed to low ambient temperatures.

Corrosion inhibiting paints have also been utilized as underbody coatings, but these are not particularly desirable because of the degree of metal preparation required prior to their application.

It is, therefore, an object of this invention to provide novel rust inhibitive water dispersed coating compositions for the protection of metals.

It is also the object of this invention to provide novel rust-inhibitive coating compositions which compositions may be easily and inexpensively applied to metal surfaces.

It is also the object of this invention to provide novel rust inhibitive coating compositions which can be applied to such metal surfaces in the form of water dispersed coating compositions.

These and other objects of the invention will become apparent from a reading of this specification.

SUMMARY OF THE INVENTION

The above objects are attained in accordance with the present invention by providing, non-asphaltic, non-mastic type water dispersed coating compositions which coalesce at drying temperatures into hardened, rust-inhibitive coatings or films said water dispersed compositions comprising (A) at least one film forming organic polymer (B) at least one non-Newtonian colloidal disperse system comprising (1) solid, metal containing colloidal particles, (2) a liquid dispersing medium and (3) an organic compound, the molecules of which contain a hydrophobic portion and at least one polor substituent and disperse system being characterized by having a base neutralization number of about 7.0 or less.

Further, in accordance to the present invention, a non-asphaltic, non-mastic type coating composition has been developed. As described herein, a "non-asphaltic, non-mastic type" coating is a coating composition of the present invention which does not require asphalt type components, e.g., bitumen mixtures of hydrocarbons, nor mastic type components, e.g., powdered rock, limestone and clays, to function as thixotrophic agents in the coating composition. This function is performed by component (B) of the present invention. As discussed above, commercially available compositions require such components in order that the coating will not run after application and prior to curing or setting of the coating. Such mastic type components are described in U.S. Pat. No. 4,161,566 to Higgins. This patent discloses coating compositions which require as one component specially treated non-binder thixotrophic clay material such as those described in "Applied Mineralogy" by Ralph E. Grimm, McGraw-Hill Book Company, New York (1962). The coating compositions of the present invention do not require such components and it is an object of the invention to avoid the use of such materials.

DETAILED DESCRIPTION OF THE INVENTION

The water dispersed coating compositions of the present invention are comprised of two major, essential ingredients. The first of these is a film forming, organic polymer, component (A). Representative classes of suitable film forming organic polymers suitable for use in the coating compositions of the present invention include polyolefins, polyamides, acrylics, polystyrenes, polyethers, polyfluorocarbons, polymercaptans, polyesters, polymethanes, acetal resins, polyterpenes, phenolics, cellulosics, melamine resins, furane resins, alkyd resins, silicone resins, natural resins, mixtures of natural resins, mixtures of natural and synthetic resins and the like. These classes of resins are well known as evidenced by such prior art publications as Modern Plastics Encyclopedia, Vol. 56, No. 10A (1979–1980), McGraw-Hill Publications. This publication contains many illustrative examples falling within the above classes of polymers including cellulosics such as cellulose nitrates, cellulose acetates, cellulose proprionates, cellulose butyrates, ethyl cellulose and the like; and mixed ester cellulosics such as cellulose acetate butyrate and the like; polyolefins such as polyethylene, polypropylene, polybutenes, polyisobutylenes, ethylene-propylene copolymers and ethylene-propylene copolymers containing up to 3 weight percent of a diolefin such as isoprene and butadiene; polyhalo olefins such as polytetrafluoroethylenes, polychlorotrifluoroethylenes and the like; polyamides including polycoprolactum, polyhexamethylenediamide, polyhexamethylenesebacamide and polyamide derived bassylic acid or terephthalic acid and alkylene diamines such as hexamethylene diamine, 2,2,4- or 2,4,4-trimethylhexamethylene diamine; polystyrene and styrene containing copolymers and terpolymers such as copolymers of styrene and acrylonitrile or terpolymers of styrene, 1,3-butadiene and acrylonitrile, copolymers of vinyl chloride, vinyldene chloride, and vinyl esters such as vinyl acetate; polyvinyl acetates such as polyvinyl acetyl per se and polyvinyl butyral; urea formaldehyde resins; melamine-formaldehyde resins; phenol-formaldehyde resins, phenol-fufural resins and the like.

A more preferred class of film forming organic polymers useful in the coating compositions of the present invention are the acrylic polymers such as the polymers and copolymers of acrylic and methacrylic acids and copolymers derived from mixtures of two or more acrylic type monomers selected from the group consisting of esters of acrylic and methacrylic acids wherein the alcoholic moiety is derived from (1) alkanols of one to about 20 carbon atoms, e.g. methanol, ethanol, butanol, octanol, lauryl alcohol, stearyl alcohol, ethylene glycol, polyethylene glycol and the like; (2) haloalkanols such as 2-chloroethanol; (3) aminoalkanols, e.g., 2-(tert-butylamino)ethanol and 2-diethylaminoethanol; (4) alkoxy alkanols exemplified by 2-methoxyethanol, 2-ethoxy-ethanol and 3-ethoxy-propanol; and (5) cycloalkanols such as cyclohexanol and cyclopropanol and the corresponding amides and polyamides of these acids including acrylamides and methacrylamides, alkylene bis-amides and N-substituted amides such as N-tert-butylacrylamide. Further representative examples of suitable acrylic polymers useful as component (A) of the invention as those derived from mixtures of at least one of the above described acrylic or methacrylic acid esters and amides with at least one monomer containing vinyl double bond unsaturation such as for example, vinyl esters as represented by vinyl acetate, vinyl proprionate, vinyl butyrates, vinyl benzoate and the like; sytrene, ring-substituted alkyl and alkoxy styrene such as, for example, the ortho-, meta- and paramethyl and ethyl styrenes, the meta- and para-isopropyl styrenes, para-butyl styrene, para-heptyl styrene, paracyclohexyl styrene, the ortho-, meta- and para-methoxy and ethoxy styrenes, 2,6-dimethoxy styrene and 2-methoxy-isopropyl styrene and the like, alpha methyl styrene and ring-substituted alpha methyl styrene such as, for example, 4-methyl alpha methyl styrene, 4-isopropyl alpha methyl styrene, 2,3-dimethyl alpha methyl styrene and the like. Preferred acrylic polymers for use as component (A) of the coating compositions of this invention are those derived from mixtures of two or more esters of acrylic and methacrylic acids wherein the alcohol moiety is derived from $C_1$ to $C_4$ alkanols and amides of acrylic and methacrylic acids and one or more of such esters and amides with one or more monomers containing vinyl double bond unsaturation such as the above described substituted and unsubstituted styrenes and alpha methyl styrenes. Most preferred acrylic polymers are those derived from two or more of the lower $C_1$ to $C_4$ alkyl esters of acrylic acid and methacrylic acid or one or more of such esters with styrenes. A most preferred class of polymers for use in this invention has been found to be those derived from the lower $C_1$ to $C_4$ esters of acrylic acid or methyacrylic acid and styrene.

The film forming organic polymers suitable for use in the present invention can be either water soluble or water insoluble. When the organic polymers are water insoluble, they will generally be present in the water phase in the form of disperse particles ranging in size from 0.1 to about 10.0 microns. A more preferred range is from about 0.5 to about 5.0 microns.

In general, the amount of the film forming organic polymer useful in the coating compositions of this invention is an amount sufficient to coalesce to a solid film after application of the coating and preferably will range from about 10.0 to about 65.0 weight percent based on the total weight of the particular coating composition. A more preferred range for the polymer is from about 15.0 to about 35.0 weight percent and a most preferred range is from about 22.0 to about 28.0 weight percent.

The second major essential ingredient of the coating compositions of the present invention is the non-Newtonian colloid disperse system, component (B) comprises of overbased salts of organic acids, said non-Newtonian colloidal disperse systems having a base neutralization number, as determined against phenolphthalein, ranging from 0 to about 7.0

The colloidal disperse systems useful in the preparation of the aqueous coating compositions of this invention exhibit non-Newtonian flow characteristics, i.e. thixotropic characteristics. The apparent viscosity of a thixotropic material depends on both the rate of shear and length of time in which said shearing action is applied. The rheological characteristics of such materials are more fully discussed in such standard texts as B. Jirgensons and M. E. Straumonis, A Short Textbook on Colloidal Chemistry (2nd Ed.), The MacMillan Co., N.Y. 1962, particularly pages 178 through 183.

The terminology "disperse system" as used in the specification and claims is a term of art generic to colloids or colloidal solutions, e.g., "any homogeneous medium containing dispersed entities of any size and state," Jirgensons and Straumanis, supra. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. This is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the over-based material and conversion agent as hereinafter described produces sufficient particle dispersion.

Basically, the solid, metal-containing particles, the first component of the colloidal disperse systems, are in the form of metal salts of inorganic acids and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems, the metal-containing particles also exist as components in micellar colloidal particles. In addition to the solid metal-containing particles and the disperse medium, the colloidal disperse systems useful in this invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Miscellar colloids represent a type of agglomerate particle as discussed thereinabove. Because of the molecular orientation in these micellar colloidal particles, such particles are characterized by a metal-containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second component of the colloidal disperse system is the dispersing medium. The identity of the medium is not a particularly critical aspect of the invention as the medium primarily serves as the liquid vehicle in which solid particles are dispersed. The disperse medium will normally consist of inert organic liquids, that is, liquids which are chemically substantially inactive. Representative liquids include the alkanes and haloalkanes of five to eighteen carbons, polyhalo and perhaloalkanes of up to about six carbons; the cycloalkanes of five or more carbons; the corresponding alkyl- and-/or halo-substituted cycloalkanes; the aryl hydrocarbons; the alkylaryl hydrocarbons; the haloaryl hydrocarbons; ethers such as dialkyl ethers; alkyl aryl ethers; cycloalkyl ethers; cycloalkylalkyl ethers; alkanols, alkylene glycols, polyalkylene gylcols and esters of said glycols; alkyl ethers of alkylene glycols and polyalkylene glycols; alkanal amines, amines and liquid polyamines; dibasic alkanoic acid diesters; silicate esters; glycerides; epoxidized glycerides; aliphatic, aromatic esters; petroleum waxes; slack waxes (non-refined paraffinic-based petroleum fractions); synthetic hydrocarbon waxes and chlorinated waxes. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropryl ketone, methyl-butyl ketone, acetophenone, 1,2-difluorotetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide diethylacetamide, propionamide, diisooctyl azelate, ethylene glycol, polypropylene glycols, hexa-2-ethylbutoxy disiloxane, etc.

Also useful as dispersing medium are low molecular weight liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffinic-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention.

The most preferred disperse systems are those containing at least some mineral oil as a component of the disperse medium. However, in this preferred class of systems, it is desirable that mineral oil comprise at least about 1% by weight of the total medium, and preferably at least about 5% by weight. Those mediums comprising at least 10% by weight mineral oil are especially useful. As will be seen hereinafter, mineral oil can serve as the exclusive disperse medium.

As mentioned hereinabove in addition to the solid, metal-containing particles and the disperse medium, the disperse systems employed in the aqueous disperse compositions of this invention require yet a third component. This third component is an organic compound which is soluble in the disperse medium, and the molecules of which are characterized by a hydrophobic portion and at least one polar substituent.

The hydrophobic portion of the organic compound is a hydrocarbon radical or a substantially hydrocarbon radical containing at least about twelve aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

In the examples set forth below, the third component of the disperse system (i.e., the organic compound which is soluble in the disperse medium and which is characterized by molecules having a hydrophobic portion and a polar substituent) is calcium petrosulfonate,

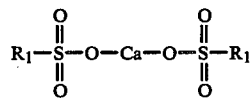

wherein $R_1$ is the residue of the petrosulfonic acid. In this case, the hydrophobic portion of the molecule is the hydrocarbon moiety of petrosulfonic, i.e.,—$R_1$. The polar substituent is the metal salt moiety,

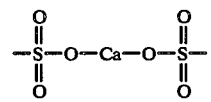

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contained polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third component of the disperse system depends upon the identity of the starting materials (i.e., the material to be overbased and the metal base compound) used in preparing the overbased materials. Once the identity of these starting materials is known, the identity of the third component in the colloidal disperse system is automatically established. Thus, from the identity of the original material, the identity of the hydrophobic portion of the third component in the disperse system is readily established as being the residue of that materials minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

Broadly speaking, the non-Newtonian colloidal disperse systems useful in preparing the compositions of the present invention are prepared by a two step process wherein a first step single phase homogeneous, Newtonian disperse system of an "overbased," "superbased," or "hyperbased," organic compound is homogenized with a "conversion agent", usually an active hydrogen containing compound, to convert this disperse system to one exhibiting non-Newtonian flow characteristics and then, in a second step, treating these converted systems with additional metal-containing reactant, and acidic material to increase the metal ratio and reduce the base neutralization numbers of the final disperse system. This treatment converts the single phase systems into the non-Newtonian colloidal disperse systems utilized in conjunction with the film forming compositions of this invention.

The terms "overbased," "superbased," and "hyperbased," are terms of art which are generic to well known classes of metal-containing materials which have generally been employed as detergents and/or dispersants in lubricating oil compositions. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

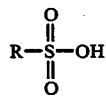

is neutralized with a basic metal compound, e.g., calcium hydroxide, the "normal" metal salt produced will contain one equivalent of calcium for each equivalent of acid, i.e.,

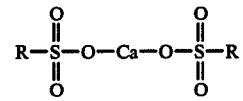

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 0.1 equivalent to about 30 or more equivalents depending on the reactions, the process conditions, and the like. These overbased materials, employed as intermediates for preparing the non-Newtonian, disperse systems used in the present invention, will contain from about 3.5 to about 30 or more equivalents of metal for each equivalent of material which is overbased.

In the present specification the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Generally, these intermediate overbased materials are prepared by treating a reaction mixture comprising (1) the organic material to be overbased, (2) a reaction medium consisting essentially of at least one inert, organic solvent for said organic material, (3) a stoichiometric excess of a metal base, and (4) a promoter with an acidic material. The methods for preparing the overbased materials as well as an extremely diverse group of overbased materials are well known in the prior art and are disclosed, for example in the following U.S. Pat. Nos.: 2,616,904; 2,616,905; 2,616,906; 2,616,911; 2,616,924; 2,616,925; 2,617,049; 2,695,910; 2,723,234;

2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135. These patents disclose processes, materials which can be overbased, suitable metal bases, promoters, and acidic materials, as well as a variety of specific overbased products useful in producing the disperse systems of this invention and are, accordingly, incorporated herein by reference.

An important characteristics of the organic materials which are overbased is their solubility in the particular reaction medium utilized in the overbasing process. As the reaction used previously has normally comprised petroleum fractions, particularly mineral oils, these organic materials have generally been oil-soluble. However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Organic materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patent and are, accordingly, incorporated herein by reference. U.S. Pat. No. 2,777,874 identified organic acids suitable for preparing overbased materials which can be converted to disperse systems for use in the resinuous compositions of the invention. Similarly, U.S. Pat. Nos. 2,616,904; 2,695,910; 2,767,164; 2,767,209; 3,147,232; 3,274,135; etc. disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are found in U.S. Pat. No. 2,798,852. A variety of overbased materials derived from oil-soluble metal-free, nontautomeric neutral and basic organic polar compounds such as esters, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are toherwise well-known in the art.

The organic liquids used as the disperse medium in the colloidal disperse system can be used as solvents for the overbasing process.

The metal compounds used in preparing the overbased materials are noramlly the basic salts of metal in Group 1-A and Group 11-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred non-Newtonian colloidal disperse systems useful in preparing the coating compositions of this invention are those derived from overbased materials containing calcium and/or barium as the metal.

The promoters, that is, the materials which permit the incorporation of the excess metal into the overbased material, are also quite diverse and well known in the art as evidenced by the cited patents. A particularly comprehensive discussion of suitable promoters is found in U.S. Pat. Nos. 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Suitable acidic materials are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as $HC_1$, $SO_2$, $CO_2$, $H_2S$, $N_2O_3$, etc. are ordinarily employed as the acidic materials. The most preferred acidic materials are carbon dioxide and acetic acid.

In preparing the intermediate overbased materials, the material to be overbased, an inert, non-polar, organic solvent therefor, the metal base, the promoter, and the acidic materials are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic materials with the metal base and the material which is said to be overbased. Thus, if mineral oil is used as the reaction medium, petrosulfonic acid as the material which is overbased, Ca(OH)$_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate. Since the overbased materials are well-known and as they are used merely as intermediates in the preparation of the disperse systems employed herein, the exact nature of the materials is not critical to the present invention.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased materials used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to forming the disperse system or thereafter.

A preferred class of overbased materials used as starting materials in the preparation of the disperse systems of the present invention are the alkaline earth metal overbased oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids suitable for preparing these overbased materials are discussed and identified in detail in the above-cited patents. Particularly U.S. Pat. Nos. 2,616,904 and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.—5000)-substituted succinic acid, polypropylene, (M.W.—10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydro-naphthalene carboxylic acid, didodecyl-tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids, dodecylbenzene sulfonic acids, didodecylbenzene sulfonic acids, dinonylbenzene sulfonic acids, cetylchlorobenzene sulfonic acids, dilauryl betanaphthalene sulfonic acids, the sulfonic acid derived by the treatment of polyisobutene having a molecular weight of 1500 with chlorosulfonic acid, nitronaphthalenesulfonic acid, paraffin wax, sulfonic acid, cetylcyclopentane sulfonic acid, lauryl-cyclohexanesulfonic acids, polyethylene (M.W.—750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least twelve.

Within this preferred group of overbased carboxylic and sulfonic acids, the barium and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acids, polybutene-substituted sulfonic acid, cetylchlorobenzene sulfonic acid, di-cetylnaphthalene sulfonic acid, stearylnaphthalene sulfonic acid, di-lauryldiphenylether sulfonic acid, di-cetylnaphthanlene sulfonic acid, di-lauryldiphenylehter sulfonic acid, di-isononylbenzene sulfonic acid, di-isooctadecylbenzenesulfonic acid, stearylnaphthalene sulfonic acid, and the like. The petroluem sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, whit oil sulfonic acid, petrolatum sulfonic acid, petroleum naphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, aleic acid, linoletic acid, linolenic acid, oleo-stearic acid, stearic acid, myristic acid, and undecalinic acid, alpha-chlorostearic acid, and alpha-nitrolauric acid.

As shown by the representative examples of the preferred classes of sulfonic and carboxylic acids, the acids may contain non-hydrocarbon substituents such as halo, nitro, alkoxy, hydroxyl, and the like.

It is desirable that the intermediate overbased materials used to prepare the non-Newtonian colloidal disperse systems used in this invention have a metal ratio of at least about 3.5 and preferably about at least 5.5. An especially suitable group of the preferred sulfonic acid overbased materials has a metal ratio of at least about 7.0. Normally the maximum metal ratio of the intermediate overbased materials will not exceed about 30 and, in most cases, not more than about 20.

The overbased materials used in preparing the non-Newtonian colloidal disperse systems utilized in the coating compositions of the invention contain from about 10% to about 70% by weight of metal-containing components. The exact nature of these metal-containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal-containing components of the overbased material would be both the amorphous compounds and the acid salt. The exact nature of these overbased materials is obviously not critical in the present invention since these materials are used only as intermediates. The remainder of the overbased materials consist essentially of the inert organic reaction medium and any promoter which is not removed from the overbased product. For purposes of this application, the organic materials which are subjected to overbasing are considered a part of the metal-containing components. Normally, the liquid reaction medium constitutes at least about 30% by weight of the reaction mixture utilized to prepare the overbased materials.

As mentioned above, the non-Newtonian colloidal disperse systems used in the coating compositions of the present invention are prepared by a two step process where in the first step a "conversion agent" and the above described overbased starting material are homogenized to convert the overbased starting material to one having non-Newtonian flow characteristics. Homogenization is achieved by vigorous agitation of the two components, preferably at the reflux temperature or a temperature slightly below the reflux temperature. The reflux temperture normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used in the specification and claims is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloracetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- or polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc; cycloalkyl alcohols exemplified by cyclopentathol, cyclohexanol, 4-methylcyclohexanol, 2-cyclohexylethanol, cyclopentylmethanol, etc; phenyl aliphatic alkanols such as benzyl alcohol, 2-phenylethanol, and cinnamyl alcohol; alkylene glycols of up to about six carbon atoms and mono-lower alkyl ethers thereof such as mono-methylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable. Alcohol:water conversions are illustrated in U.S. Pat. No. 3,372,115, filed Mar. 21, 1966.

Phenols suitable for use as conversions agents include phenol, naphthol, ortho-cresol, para-cresol, catechol, mixtures of cresol, para-tert-butylphenol, and other lower alkyl substituted phenols, meta-polyisobutene (M.W.—350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclid amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolmaine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g, alkyl—$B(OH)_2$ or aryl—$B(OH_2$, boric acid (i.e., $H_3BO_3$), tetraboric acid, metaboric acid, and esters of such boron acids.

The phosphrous acids are useful conversion agents and include the various alkyl and aryl phophinic acids, phosphinus acids, phosphonic acids, and phosphonous acids. Phosphorus acids obtained by the reaction of lower alkanols or unsaturated hydrocarbons such as polyisobutenes with phosphorus oxides and phophorus sulfides are particularly useful, e.g., $P_3O_5$ and $P_2S_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased starting materials are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as reactant in preparing the overbased starting material. It has been found that a more uniform colloidal disperse system results if such contaminants are removed prior to homogenizing the overbased materials with the conversion agents. Accordingly, it is preferred that any insoluble contaminants in the intermediate overbased materials be removed prior to converting the material into the non-Newtonian colloidal disperse system. The removal of such contaminants is easily accomplished by conventional techniques such as filtration, centrifugation or by treatment with additional acidic material. It should be understood however, that while the removal of these contaminants from the intermediary overbased materials are desirable, their removal from the final non-Newtonian colloidal disperse systems used in the coating composition of the invention is an absolute essential aspect of the invention if useful coating compositions constituting this invention are to be obtained.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased materials in such a manner as to be permanently bound thereto through some type of chemical bonding, it is normally a simple matter to remove a major proportion of the conversion agents and generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

it is not essential that all of the conversion agent be removed from the disperse systems. However, from the standpoint of achieving uniform results, it is generally desirable to remove the conversion gents, particularly where they are volatile.

The second step in preparing the non-Newtonian colloidal disperse systems used in the coating compositions of this invention is to treat the homogenized, non-Newtonian colloidal disperse system prepared in the first step, described herein above, with further metal-containing reactant and acidic material. The metal-containing reactant and acidic material employed in this second step are the same reactants and materials described above for preparing the overbased starting materials. Treatment of the homogenized colloidal disperse system from the first step in the preparation of the disperse systems useful in this invention generally will be carried out at temperatures ranging from about 50° C. to about 90° C. and preferably from about 60° C. to about 80° C.

The amount of additional metal-containing reactant will be that amount sufficient to increase the metal ratio of the homogenized colloidal disperse systems from the first step in the process for preparing the disperse systems useful in the invention from at least 7.0 to above about 10.0 and preferably above about 20.0. Given the metal ratio of the homogenized precursor disperse system, one of skill in the art can readily determine the amount of metal-containing reactant necessary to increase the metal ratio of the homogenized precursor to that in the final disperse system.

The amount of acidic material employed in the second step in the preparation of the non-Newtonian colloidal disperse system useful in this invention will be that amount sufficient to reduce the neutralization base number of the disperse systems to a level wherein the coating compositions of the invention will exhibit a good shelf life stability. Generally that amount will be that sufficient to reduce the neutralization base number of the final disperse system to about 7.0 or less. A more preferred disperse system will be that having a neutralization base number of about 5.0 or less and most preferred is a disperse system having a neutralization base number of 2.0 or less.

In the water dispersed coating compositions of this invention, the amount of the non-Newtonian colloidal disperse system, component (B), described immediately above, will be added in an amount sufficient to inhibit rust when applied to a substrate and to give the coating composition desired thixotrophic characteristics. Preferably, component (B) will range from about 1.0 to about 20.0 percent by weight based on the total weight of the coating composition. A more preferred range for the disperse system is from about 10.0 to about 20.0 percent by weight based on the total weight of the coating composition.

In addition to the two major components comprising the water dispersed coating compositions of this invention, it is preferable in most instances to also include a plasticizing material, component (C), for the organic polymers employed in these compositions. The use of a plasticizer assures that the coating compositions will exhibit the resilience, flexibility and impact strength required of them over a broad range of service temperatures. Plasticizers which can be utilized as component (C) in the coating compositions of the present invention include adipates, azelates, sebacates, phthalates, phosphates and the like. Specific examples of such plasticizers are the dialkyl adipates such as dimethyl adipate, dibutyl adipate, dioctyl adipate, diisooctyl adipate, di-(2-ethylhexyl)adipate, octyl decyl adipate and the like; dialkyl azelates such as dicyclohexyl azelate, di-n-hexyl azelate, di(2-ethylhexyl)azelate, di-(2-ethylbutyl)azelate, diisoctylazelate and the like; dialkyl sebacates such as dibutyl sebacate, dioctyl sebacate, diisoctyl sebacate, dibenzyl sebacate and the like; dialkyl phthalates such as diethyl phthalate, dibutyl phthalate, dioctylphthalate, butyl octyl phthalate, di(2-ethylhexyl)phthalate, dicyclohexylphthalate, butyl benzyl phthalate; triaryl phosphates such as tricresyl phosphate, triphenylphosphate, cresyldiphenol phosphate and the like; trialkyl phosphates such as trioctyl phosphate, tributylphosphates and the like; alkyl aryl phosphates such as octyl diphenyl phosphate and the like. Other plasticizers include citrates such as acetyl tri-n-butyl citrate, acetyl triethyl citrate, monoisopropyl citrate, triethyl citrate, mono-, di- and tri-stearyl citrate; trioctin; p-tert-butyl phenyl salicylate; butyl stearate; benzoic acid esters derived from diethylene glycol, dipropylene glycol, triethylene glycol, and polyethylene glycols; proprietary polymeric polyesters such as those sold by Rohm & Haas Company under the trademark Paraplex, sulfonamides such as toluene sulfonamide and etc. A complete listing of illustrative suitable plasticizers can be found in Modern Plastics Encyclopedia, Vol. 56, No. 10A (1979-1980), McGraw-Hill Publications, pages 685-694.

The amount of plasticizer employed, if one is employed, will depend on the nature of the polymeric resin and the plasticizer. Generally, however, the amount of plasticizer employed will range from 0 to about 15.0 percent by weight and preferably from about 2.0 to about 7.0 percent by weight based on the total weight of the coating composition.

In addition to the two major components of the aqueous emulsion coating compositions of this invention and the optional plasticizer component (C) it is also preferable to include in the compositions an effective amount of a coalescing agent, component (D). As is well known, coalescing agents are generally high boiling solvents incorporated in coating compositions to aid in film formation and to improve leveling, adhesion and enamel holdout of the coating composition. Typically, the amount of said coalescing agent will range from 0 to about 20.0 percent by weight based on the total weight of the coating composition. Preferably the amount will range from about 3.0 to about 10.0 percent by weight. Representative examples of coalescing agents which can be employed in the compositions of this invention include Carbitol TM (diethylene glycol), Carbitol TM acetate, butyl Cellosolve TM acetate, butyl Carbitol TM acetate, butoxy ethanol, alkylene glycols, ethylene glycol, propylene glycol, butylene glycol, hexylene glycol, polyethylene glycol, alkylene glycol monoalkyl ethers such as ethylene glycol monomethyl ether, ethylene glycol monoethyl ether, ethylene glycol monobutyl ether, dialkylane glycol monoalkyl ethers such as diethylene glycol monomethyl ether, diethylene glycol monoethyl ether, diethylene glycol monobutyl ether and the like. Esters of these alkylene glycols, alkylene glycol monoalkyl ethers, and dialkylene glycol monoalkyl ethers also can be employed as coalescing agent (D) and include such representative materials as ethylene glycol diacetate, ethylene glycol monoacetate, propylene glycol monostearate, ethylene glycol monoethyl ether acetate, diethylene glycol monoethyl ether acetate and the like. Other known coalescing agents useful in the compositions of this invention include diacetone alcohol, aliphatic benzenes such as xylene and Texanol TM (2,2,4-trimethyl-1,3-pentanediol monoisobutyrate).

The compositions of the present invention can also include one or more supplemental additives or adjuvants. These supplemental additives or adjuvants can include flash rust inhibitors, pH modifiers, fillers and extending agents and the like.

Flash rust inhibitors are agents which prevent rusting of metal surfaces immediately upon coating with the water dispersed coating compositions. While the films formed by water removal from the water dispersed compositions of the present invention serve to prevent corrosion of such surfaces once they are formed, flash rust inhibitors are used to prevent rust and corrosion before the films have had a chance to form. Typical flash rust inhibitors include ammonium benzoate and phosphoric acid esters neutralized with tetraethylene pentamine. Flash rust inhibitors which are preferred for use in the water dispersed coating compositions of this invention include N-(hydroxyl-substituted hydrocarbyl)amines such as primary, secondary and tertiary alkanolamines corresponding, respectively, to the following formulae:

$$H_2N-R^1-OH \qquad (I)$$

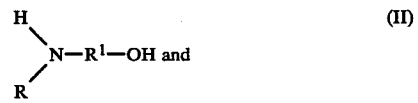

$$\begin{array}{c} H \\ \diagdown \\ N-R^1-OH \text{ and} \\ \diagup \\ R \end{array} \qquad (II)$$

$$\begin{array}{c} R \\ \diagdown \\ N-R^1-OH \\ \diagup \\ R \end{array} \qquad (III)$$

wherein each R is independently a hydrocarbyl group of one to about eight carbon atoms or a hydroxyl-substituted hydrocarbyl group of two to about eight carbon atoms and $R^1$ is a divalent hydrocarbyl group of about 2 to about eighteen carbon atoms. The group $-R^1-OH$ in such formulae represents a hydroxyl-substituted hydrocarbyl group. The divalent hydrocarbyl group, $R^1$, can be an acyclic, alicyclic or aromatic group. Typically it is an acyclic straight or branched chain alkylene group such as ethylene; 1,2-propylene; 1,2-butylene; 1,2-octadecylene; and etc. Where two R groups are present in the same molecule, they can be joined by a direct carbon-to-carbon bond or through a heteroatom such as oxygen, nitrogen or sulfur to form a five, six, seven or eight membered ring structure. Examples of such heterocyclic amines include N-(hydroxyl-substituted lower alkyl)-morpholines, -thiomorpholines, -piperdines, -oxazolidines, -thiazolidines and the like. Generally, however, each R group is a lower alkyl group of up to seven carbon atoms. Particularly useful N-(hydroxyl-substituted hydrocarbyl)amines for providing flash rust inhibitors include mono-, di- and triethanol amine, dimethylethanol amine, diethylethanol amine, N,N-di-(3-hydroxyl propyl)amine, N-(3-hydroxyl butyl)amine, N-(4-hydroxyl butyl)amine, N,N-di-(2-hydroxyl propyl)amine, N-(2-hydroxyl ethyl)morpholine and its thio analog, N-(2-hydroxyl ethyl)cyclohexyl amine and the like. These N-(hydroxyl-substituted hydrocarbyl)amines can be used either alone or in mixture. Preferred amines are diethyl ethanol amine, ethanol amine and dimethyl ethanol amine.

The above described amines are also useful as pH modifiers for the water dispersed coating compositions of this invention and therefore serve a dual purpose in said compositions. The desired pH range of the water dispersed compositions of this invention is from about 7 to about 10 and the addition of from about 1.0 to about 3.0 percent by weight, based on the total weight of the coating compositions, will suffice to maintain the pH of the coating compositions. It has also been found that this amount will also provide the desired level of flash rust inhibitive protection for the metal being coated while the water in the coating is being removed.

Various fillers or extender pigments can also be added to the water dispersed coating compositions described and claimed herein. These include clays, talc, wallastonite, barytes, calcium carbonate, silica, mica, carbon black, lamp black and similar fillers and pigments. These fillers and pigments can comprise from 0 to about 40.0 percent by weight and preferably between 1.0 and about 15.0 percent by weight based on the total weight of the composition.

The inventive water dispersed coating compositions are, in general, prepared by the intimate blending of the various components under high shear conditions such as a Cowles disperser. Typically, the film forming organic polymer in aqueous solution or latex form, water and plasticizer, flash rust inhibitor and pH modifier, if any, are first blended together under low shear conditions. Once complete blending has been accomplished, the non-Newtonian colloidal disperse system, and filler or pigment are added under high speed, high shear conditions and the blending continued until an intimate and water dispersed is achieved. Additional water can be added at this point if necessary to adjust the viscosity of the composition to that required by the particular method of application to be used in applying the coating composition to the metal surface to be coated.

The water dispersed coating compositions of the invention are useful in forming rust inhibiting coatings or films for metal surfaces such as surfaces of ferrous metals, galvanized metal, aluminum, magnesium, etc. They are especially useful for internally rustproofing and undercoating automotive bodies and the like. They may be employed in these applications either alone or in combination with other known rust-inhibiting materials.

When used for rust inhibiting purposes, the water dispersed coating compositions of the present invention may be applied to the metal surface by any of a number of known methods such as brushing, spraying, dip coating, flow coating, roller coating and the like. The viscosity of the water dispersed coating composition may be adjusted for the particular method of application employed by adjusting the amount of water present in the water dispersed coating composition if a reduced viscosity is required or by the addition of fillers such as talc, silicon, calcium carbonate and the like if an increased viscosity is required. Finally, mechanical shearing techniques can also be used to vary the viscosity of the water dispersed coating compositions since they are thixotropic in nature. This shearing can be accomplished by using agitators or by forcing the compositions through pumps (e.g. gear pumps) or other devices such as nozzles.

The film thickness produced on the metal substrate is not critical although coatings or films of from 0.5 to about 6.0 mils and preferably from 1.0 to about 4.0 mils are generally sufficient to provide adequate rust and corrosion protection. Thicker films can be used if desired, particularly if the metal article is to be subjected to severe corrosion enhancing conditions, or to be stored for prolonged periods of time.

The water dispersed coating compositions of the present invention are generally applied to the surface to be protected by any of the means described above and then air dried. Generally, this drying of the applied coating will take place at temperatures ranging from ambient temperature to temperatures of about 150° C. or higher. The precise temperature employed and time required to complete drying will vary depending on the thickness of the coating and the Tg of the polymeric resin employed in the coating composition. Those skilled in the art can readily determine the time and temperature required to dry the coating completely.

The following non-limiting examples illustrate the practice of this invention and include the presently known best mode of practicing the invention. All temperatures are in degrees Celcius and all percentages and parts are by weight unless it is specifically noted to be to the contrary.

EXAMPLE 1

A calcium mahogany sulfonate is preaprred by double decomposition of a 60% oil solution of 750 parts of sodium mahogany sulfonate with the solution of 67 parts of calcium chloride and 63 parts of water. The reaction mass is heated for four hours at 90° to 100° C. to affect the conversion of the sodium mahogany sulfonate to calcium mahogany sulfonate. Then 54 parts of 91% calcium hydroxide solution is added and the material is heated to 150° C. over a period of five hours. When the material has cooled to 40° C., 98 parts of methanol is added and 152 parts of carbon dioxide is introduced over a period of 20 hours at 42°–43° C. Water and alcohol are then removed by heating the mass to 150° C. The residue in the reaction vessel is diluted with 100 parts of mineral oil. The filtered oil solution and the desired carbonated calcium sulfonate overbased material shows the following analysis: sulfate ash content, 16.4%; a neutralization number, as measured against phenophthalein of 0.6 (acidic); and a metal ratio of 2.50.

EXAMPLE 2

A mixture comprising 1,595 parts of the overbased material of Example 1 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol and 56 parts of mixed isomeric primary amyl alcohols (containing about 65% normal amyl, 3% isoamyl and 32% 2-methyl-1-butyl alcohols) is stirred vigorously at 40° C. and 25 parts of carbon dioxide is introduced over a period of two hours at 40°–50° C. Thereafter, three additional portions of calcium hydroxide, each amounting to 157 parts each are added and each such addition is followed by the introduction of carbon dioxide as previously illustrated. After the fourth calcium hydroxide addition and the carbonation step is completed, the reaction mass is carbonated for an additional hour at 43°–47° C. to reduce the neutralization number of the mass to 4.0 (basic). The substantially neutral, carbonated reaction mixture is then heated to 150° C. under a nitrogen atmosphere to remove alcohol and any by-product water. The residue in the reaction vessel is then filtered. The filtrate, an oil solution of the desired substantially neutral, carbonated calcium sulfonate overbase material of high metal ratio shows the following analysis: sulfate ash content 41.11%; neutralization number 0.9 (basic); and a metal ratio of 12.55.

The calcium phenate used above is prepared by adding 2,550 parts of mineral oil, 960 parts (5 mols) of heptylphenol, and 50 parts of water into a reaction vessel and stirring at 25° C. The mixture is heated to 40° C. and 7 parts of calcium hydroxide and 231 parts (7 mols) of 91% commercial paraformaldehyde is added over a period of one hour. The contents are heated to 80° C. and 200 additional parts of calcium hydroxide (making a total of 207 parts or 5 mols) is added over a period of one hour at 80°–90° C. The contents are heated to 150° C. and maintained at that temperature for twelve hours while nitrogen is blown through the mixture to assist in the removal of water. If foaming is encountered, a few drops of polymerized dimethylsilicone foam inhibitor may be added to control the foaming. The reaction mass is then filtered. The filtrate, a 33.6% oil solution of the desired calcium phenate of heptaphenolformaldehyde condensation product is found to contain 7.56% sulfate ash.

EXAMPLE 3

A mixture of 1,000 parts of the product of Example 2, 303 parts of mineral oil, 80 parts of methanol, 40 parts of mixed primary amyl alcohols (containing about 65% by weight of normal amyl alcohol, 3% by weight of isoamyl alcohol, and 32% by weight of 2-methyl-1-butyl alcohol) and 80 parts of water are introduced into a reaction vessel and heated to 70° C. and maintained at that temperature for 4.2 hours. The overbased material is converted to a gelatinous mass. Stirring and heating of this gelatinous mass at 150° C. is continued for a period of about two hours to remove substantially all the alcohols and water. The residue is a dark green gel.

EXAMPLE 4

A solution of 1,303 parts of the gell like colloidal disperse system of Example 3 and 563 parts of mineral oil are dissolved in 1,303 parts of toluene by continuous agitation of these two components for about three hours. Added to this mixture is 40 parts of water and 40 parts of methanol followed by the slow addition of 471 parts of 91% calcium hydroxide with continuous stirring. An exothermic reaction takes place raising the temperature to 32° C. The entire reaction mass is then heated to about 60° C. over a 0.25 hour period. Two hundred-eighty parts of carbon dioxide is then charged over a five hour period while maintaining the temperature at 60°–70° C. At the conclusion of the carbonation, the mass is heated to about 150° C. over a 0.75 hour period to remove water, methanol, and toluene. The resulting product, a clear, light brown colloidal disperse system in the form of a gel has the following analysis: sulfate ash content, 46.8%; a neutralization number, as measured against phenolphthalein of less than 1.0 (basic); and a metal ratio of 36.0. In the above-described procedure, additional metal containing particles are incorporated into the colloidal disperse system of Example 3 and its base neutralization number decreased to give a non-Newtonian colloidal disperse system useful in the invention of this application.

EXAMPLE 5

To a one gallon glass jar equipped with high speed agitation is charged 1920 parts of Neocryl TM A-620, a styrene/isobutyl acryate copolymer (50/50 mole ratio) latex wherein said copolymer, on a weight basis, constitutes 40 weight percent of the total weight of the latex system. This material is commercially available from Polyvinyl Chemical Industries. Four hundred-twenty parts of the colloidal material from Example 4 is then added and the contents are stirred under high speed, high shear agitation conditions for a period of five minutes. The stirring rate is then reduced and to this material is then charged 160 parts of propylene glycol, 300 parts of water, 160 parts of Paraplex TM WP-1, a polymeric polyester plasticizer available from Rohm and Haas, 120 parts of water, 20 parts of 2-amino-2-methyl-1-propanol, and 45 parts of Aquablack TM 115A, a black pigment dispersion available from Bordon Chemical. This mixture is then stirred for an additional five minutes to give the final water-dispersed coating composition.

EXAMPLE 6

To a one gallon glass jar equipped with a dispersator fitted with a 1¾ inch Cowles blade are charged in the following order: one thousand eight hundred-eighty parts of Neocryl TM A-620, 408 parts of the colloidal material from Example 4, 156 parts propylene glycol, 156 parts dioctyladipate (DOA), 156 parts water, 56 parts dimethyl ethanolamine (DMEA). The contents are stirred under high speed agitation to give a water-dispersed coating composition of this invention.

EXAMPLE 7

A water-dispersed coating composition is prepared employing the same procedure, materials and quantities as employed in Example 6 except that 43 parts of Aquasperse TM, 877-999-7, a black pigment dispersion available from Tenneco, is added after the DMEA and stirring continued until the pigment was completely incorporated into the coating composition.

EXAMPLE 8

To a one gallon glass jar equipped with a dispersator fitted with a 1¾ inch Cowles blade is charged 2037 parts of Neocryl TM A-620. With continuous agitation 448 parts water and 167 parts Paraplex TM WP-1 are charged to the glass jar. The agitation rate is then increased to high speed, and 64 parts of DMEA and 5 parts Aquasperse TM are charged to the contents of the jar. The resulting mixture was stirred for ten minutes during which time the temperature of the mixture was increased to 50° C. At the end of this time, 434 parts of the material from Example 4 are charged to the glass jar and high speed agitation continued for an additional five minutes. An additional 82 parts of water are added to the contents of the jar to adjust the final coating composition to the desired viscosity.

EXAMPLE 9

To a six liter stainless steel pot equipped with a dispersator fitted with a 1¾ inch Cowles blade are charged in the order listed: two thousand five hundred-twenty parts of Neocryl ™ A-620, 700 parts of water, 210 parts of Paraplex ™ WP-1, 110 parts of propylene glycol, 480 parts of red iron oxide, 300 parts of 325 mesh mica, and 1500 parts of talc. The contents are mixed together at maximum speed for 15 minutes at which time there is charged to the pot 120 parts of DMEA, 600 parts of the material from Example 4, and 25 parts of water. Stirring of the contents in the pot is continued at maximum speed for ten minutes and the contents then filtered through a 100 mesh screen to give the final water-dispersed coating composition.

EXAMPLE 10

To a five gallon pail equipped with a three inch Cowles blade attached to a shaft connected to a variable speed motor are charged 6240 parts Neocryl ™ A-620, 120 parts of Nopco ™ NDW, a latex defoamer available from Diamond Shamrock, and 1560 parts of the material from Example 4. The contents are ground at high speed for five minutes. At this time the rate of agitation is reduced and 260 parts of Paraplex ™ WP-1, 260 parts of Texanol ™ ester alcohol, 2,2,4-trimethylpentanediol-1,3-monoisobutyrate available from Eastman Chemical Products, Inc., 600 parts of Carbitol ™, diethylene glycol monoethylether available from Dow Chemical Company, 600 parts of propylene glycol, 60 parts Troykyd ™ 999, a non-silicone defoamer available from Troy Chemical Company, 180 parts of 2-amino-2-methyl-1-propanol, and 600 parts of water, and charged to the previously ground materials. Agitation is continued at medium speeds to achieve complete dispersion of the various ingredients forming the final water dispersed coating composition.

The anticorrosion characteristics of the water-dispersed coating compositions prepared above in Examples 5 through 10 are determined by the use of the Salt-Fog Corrosion Test (ASTM test B117-73-(1979)). In this test, steel panels measuring 4 inches wide by 8 inches long are coated with the above prepared water-dispersed coating compositions to give dry film thicknesses of 2 mils. The coated, dry panels are then suspended in a Salt-Fog cabinet and a 5% sodium chloride solution continuously sprayed onto the panels at 37.8° C. for 24 hours. By this test an uncoated panel is corroded over the entire surface at the end of 24 hours whereas a panel coated with a water-dispersed coating composition prepared by the procedure of Example 6 shows less than 1% rust at the end of 336 hours and less than 2% rust at the end of 500 hours along a scribed line made through the coating to the underlying metal. The results of this testing is set forth in Table 1 below.

TABLE 1

| Example | Hours | Creep[a] Millimeters (mm) | % Rust |
|---|---|---|---|
| 5 | 336 | 2–8 | 20 |
| 5 | 500 | 3–8 | 40 |
| 6[b] | 336 | 3–6 | <1 |
| 6[b] | 500 | 3–8 | <2 |

TABLE 1-continued

| Example | Hours | Creep[a] Millimeters (mm) | % Rust |
|---|---|---|---|
| 7[b] | 336 | 4–8 | <2 |
| 7[b] | 500 | 4–10 | 5 |
| 8 | 336 | 0–1 | <1 |
| 8 | 500 | 1–3 | <1 |
| 8 | 1000 | 4–6 | <5 |
| 9 | 336 | 0 | <2 |
| 9 | 500 | 1–2 | 50 |
| 10 | 336 | 1–2 | <1 |
| 10 | 500 | 2–3 | <2 |

[a]extent of corrosion measured from a scribed line made through the coating to expose the underlying metal
[b]4" × 12" panels employed

What is claimed is:

1. A non-asphaltic, non-mastic type coating composition comprising an effective amount of water and dispersed within said water
   (A) a film forming amount of a film forming organic polymer and
   (B) a non-Newtonian colloidal disperse system comprising (1) solid metal containing colloidal particles, (2) a liquid dispersing agent and (3) an organic compound the molecules of which contain a hydrophobic portion and at least one polar substituent,
wherein said non-Newtonian colloidal disperse system is characterized by having a neutralization base number of about 7.0 or less and is present in an amount sufficient to inhibit rust formation on the substrate to which said coating composition is applied.

2. The composition of claim 1 wherein said film forming organic polymer (A) ranges from about 10.0 to about 65.0 weight percent and the non-Newtonian colloidal disperse system (B) ranges from 1.0 to about 20.0 weight percent said percentages based on the total weight of the composition.

3. The composition of claim 2 wherein the film forming organic polymer (A) is an organic polymer selected from the group consisting of polyolefin resins, acrylic resins, polyester resins and polyurethanes and wherein the non-Newtonian colloidal disperse system comprises (1) solid metal containing particles selected from the group consisting of alkali and alkaline earth metal salts, (2) a disperse medium selected from the group consisting of inert organic liquids and low molecular weight liquid polymers and (3) an organic compound selected from the group consisting of alkali and alkaline earth metal salts of oil soluble organic acids.

4. The composition of claim 1 which further comprise (C) a plasticizer and (D) a coalescing agent wherein said compositions the plasticizer (C) ranges from 0 to about 15.0 weight percent and the coalescing agent (D) ranges from 0 to about 20.0 weight percent said percentages based on the total weight of the composition.

5. The composition of claim 1 which further comprise at least one flash rust inhibitor which ranges from 0.1 to about 3.0 weight percent based on the total weight of the composition.

6. A non-asphaltic, non-mastic type coating composition comprising an effective amount of water and dispersed within said water
   (A) a film forming amount of a film forming water dispersed organic polymer in the form of disperse particles, wherein said polymer is an acrylic copolymer derived from mixtures of two or more ethylenically unsaturated monomers or at least one ethylenically unsaturated monomer and at least one vinyl double bond unsaturated monomer and (B) a non-Newtonian colloidal disperse system comprising (1) solid metal-containing colloidal particles, (2) a liquid dispersing medium and (3) an organic compound, the molecules of which contain a hydrophobic portion and at least one polar substituent wherein said non-Newtonian colloidal disperse system is characterized by having a neutralization base number of about 7.0 or less and is present in an amount sufficient to inhibit rust formation on the substrate to which said coating composition is applied.

7. The composition of claim 6 wherein said film forming water dispersed polymer (A), as solids, ranges from about 10.0 to about 65.0 weight percent and the non-Newtonian colloidal disperse system (B) ranges from about 1.0 to about 20.0 weight percent said percentages based on the total weight of the composition.

8. The composition of claim 6 wherein the water dispersed organic polymer (A) is an acrylic copolymer derived from a mixture of two or more ethylenically unsaturated monomers selected from the group consisting of lower $C_1$ to $C_4$ alkyl esters and amides of acrylic and methacrylic acids or derived from a mixture of at least one ethylenically unsaturated monomer selected from the group consisting of lower $C_1$ to $C_4$ alkyl esters and amides of acrylic and methacrylic acids and at least one vinyl double bond unsaturated monomer selected from the group consisting of styrene, ring substituted alkyl and alkyloxy styrene, alpha methyl styrene and ring substituted alkyl alpha methyl styrene and wherein the non-Newtonian colloidal disperse system (B) comprises (1) solid metal containing particles selected from the group consisting of alkali and alkaline earth metal salts, (2) a disperse medium comprising a liquid petroleum fraction and (3) at least one organic component selected from the group consisting of alkali and alkaline earth metal salts of oil soluble organic acids said disperse system being characterized by having a neutralization base number about 5.0 or less and wherein the water dispersed polymer (A), as solids, ranges from about 15.0 to about 35.0 weight percent and the disperse system (B) ranges from about 10.0 to about 15.0 weight percent based on the total weight of the aqueous emulsion coating composition.

9. The composition of claim 8 wherein the water dispersed polymer (A) is an acrylic copolymer derived from a mixture of two or more ethylenically unsaturated monomers selected from the group consisting of lower $C_1$ to $C_4$ alkyl esters and amides of acrylic and methacrylic acids.

10. The composition of claim 9 wherein the ethylenically unsaturated monomers are the lower $C_1$ to $C_4$ alkyl esters of acrylic and methacrylic acid.

11. The composition of claim 8 wherein the water dispersed polymer (A) is an acrylic copolymer derived from a mixture of at least one ethylenically unsaturated monomer selected from the group consisting of the lower $C_1$ to $C_4$ alkyl esters and amides of acrylic and methacrylic acids and at least one vinyl double bond unsaturated monomer selected from the group consisting of styrene, ring substituted alkyl and alkyloxy styrene, alpha methyl styrene and ring substituted alkyl alpha methyl styrene.

12. The composition of claim 11 wherein the ethylenically unsaturated monomer is selected from the group consisting of $C_1$ to $C_4$ lower alkyl ester of acrylic and methacrylic acids.

13. The composition of claim 12 wherein the vinyl double bond unsubstituted monomer is selected from the group consisting of styrene, ring substituted alkyl styrene and alpha methyl styrene.

14. The composition of claim 8 wherein the solid metal containing particles are alkaline earth metal salts and the organic compound is an alkaline earth metal salt of an oil soluble organic acid.

15. The composition of claim 14 wherein the solid metal containing alkaline earth metal salts are selected from the group consisting of magnesium, calcium, strontium and barium carbonates.

16. The composition of claim 14 wherein the solid metal containing alkaline earth metal salts is selected from the group consisting of calcium and barium carbonates.

17. The composition of claim 15 wherein the alkaline earth metal salt of an oil soluble organic acid is selected from the group consisting of calcium and barium sulfonate and carboxylate.

18. The composition of claim 8 which further comprise (C) a plasticizer and (D) a coalescing agent wherein said composition and plasticizer (C) ranges from 0 to about 15.0 weight percent and the coalescing agent (D) ranges from 0 to about 20 weight percent said percentages based on the total weight of the coating composition.

19. The composition of claim 18 wherein the plasticizer (C) is selected from the group consisting of dialkyl adipates, dialkyl azelates, dialkyl sebacates, dialkyl phthalates, triaryl phosphates, alkyl aryl phosphates and polymeric polyesters and wherein the coalescing agent (D) is selected from the group consisting of alkylene gylcols, alkylene glycol monoalkyl ethers and dialkylene glycol monoalkyl ethers.

20. The composition of claim 19 wherein the plasticizer (C) ranges from about 2.0 to about 7.0 weight percent and the coalescing agent (D) ranges from about 3.0 to about 10.0 weight percent based on the total weight of the coating composition.

21. The composition of claim 20 wherein the plasticizer (C) is a dialkyl adipate and the coalescing agent (D) is an alkylene glycol.

22. The composition of claim 18 which further comprises at least one flush rust inhibitor which ranges from 1.0 to 3.0 weight percent based on the total weight of the composition.

23. The composition of claim 22 wherein the flash rust inhibitor comprises at least one N-(hydroxy-substituted hydrocarbyl)amine.

24. A non-asphaltic, non-mastic type coating composition comprising an effective amount of water and dispersed within said water (A) a film forming amount of a film forming water dispersed, organic polymer in the form of disperse particles, a major portion of said particles ranging in size from about 0.1 to about 10.0 microns, said water dispersed polymer being an acrylic copolymer derived from a mixture of monomers comprising two or more ethylenically unsaturated monomers selected from the group consisting of lower $C_1$ to $C_4$ alkyl esters of acrylic and methacrylic acids or from a mixture comprising at least one ethylenically unsaturated monomer selected from the group consisting of $C_1$ to $C_4$ lower alkyl esters of acrylic and methacrylic acids and at least one vinyl double bond unsaturated monomer selected from the group consisting of styrene, ring substituted alkyl styrene and alpha methyl styrene and (B) a non-Newtonian colloidal disperse system comprising (1) solid metal containing particles of alkaline earth metal salts, (2) a disperse medium comprising a liquid petroleum fraction and (3) at least one organic compound comprising alkaline earth metal salts of oil soluble organic acids said disperse system being characterized by having a neutralization base number of about 2.0 or less and the film forming water dispersed polymer (A), as solids, ranges from about 22.0 to about 29.0 weight percent and the disperse system (B) ranges from about 10.0 to about 15.0 weight percent based on the total weight of the composition.

25. The composition of claim 24 wherein the water dispersed polymer (A) is derived from a mixture comprising two or more ethylenically unsaturated monomers selected from the group consisting of $C_1$ to $C_4$ lower alkyl esters of acrylic and methacrylic acids.

26. The composition of claim 24 wherein the water dispersed polymer (A) is derived from a mixture comprising at least one ethylenically unsaturated monomer selected from the group consisting of $C_1$ to $C_4$ lower alkyl esters of acrylic and methacrylic acids and at least one vinyl double bond unsaturated monomer selected from the group consisting of styrene, ring substituted alkyl sytrene and alpha methyl styrene.

27. The composition of claim 24 wherein the colloidal disperse system comprises (1) solid metal containing particles of alkaline earth metal salts selected from the group consisting of calcium and barium carbonates, (2) a disperse medium comprising mineral oil and (3) at least one alkaline earth metal salt of oil soluble organic acids selected from the group consisting of calcium and barium sulfonate and carboxylate.

28. The composition of claim 25 which further comprise a plasticizer (C) selected from the group consisting of dialkyl adipates, dialkyl azelates, dialkyl sebacates and dialkyl phthalates and a coalescing agent (D) selected from the group consisting of alkylene glycols, alkylene glycol monoalkyl ethers and diethylene glycol monoalkyl ethers wherein the plasticizer (C) ranges from about 2.0 to about 7.0 weight percent and the coalescing agent (D) ranges from about 3.0 to about 10.0 weight percent based on the total weight of the coating composition.

29. The composition of claim 28 which further comprises at least one flash rush inhibitor comprising N-(hydroxyl-substituted hydrocarbyl)amines selected from the group consisting of primary, secondary and tertiary alkanol amines of the formulae $$H_2N-R^1-OH \quad (I)$$

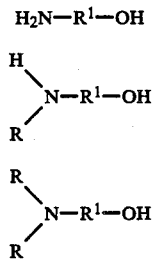

wherein each R is independently a hydrocarbyl group of one to about eight carbon atoms or a hydroxyl-substituted hydrocarbyl group of from about two to about eight carbon atoms and $R^1$ is a divalent hydrocarbyl group of from about two to about eighteen carbon atoms said inhibitor ranging from 1.0 to about 3.0 weight percent based on the total weight of the composition.

30. A non-asphaltic, non-mastic type coating composition comprising an effective amount of water and dispersed within said water:

(A) a film forming amount of a film forming water dispersed organic polymer in the form of dispersed particles, a major portion of said particles ranging in size from about 0.5 to about 5.0 microns said water dispersed polymer being an acrylic copolymer derived from a mixture of monomers comprising at least one ethylenically unsaturated monomer selected from the group consisting of $C_1$ to $C_4$ lower alkyl esters of acrylic and methacrylic acids and at least one vinyl double bond unsaturated monomer selected from the group consisting of styrene, ring-substituted alkyl styrene and alpha methyl styrene (B) a non-Newtonian colloidal disperse system comprising (1) solid metal containing particles of alkaline earth metal salts selected from the group consisting of calcium and barium carbonates, (2) a disperse medium comprising mineral oil and (3) at least one alkaline earth metal salt of oil soluble organic acids selected from the group consisting of calcium and barium sulfonate and carboxylates said disperse system being characterized by having a neutralization base number of 2.0 or less and is present in an amount sufficient to inhibit rust formation on the substrate to which said coating composition is applied.

31. The composition of claim 30 wherein the vinyl double bond unsaturated monomer is styrene.

32. The composition of claim 31 wherein the colloidal disperse system comprises (1) calcium carbonate, (2) mineral oil and (3) calcium sulfonate.

33. The composition of claim 32 further comprising a plasticizer (C) selected from the group consisting of dialkyl adipates and a coalescing agent (D) selected from the group consisting of alkylene glycols wherein the plasticizer (C) ranges from about 2.0 to about 7.0 weight percent and the coalescing agent (D) ranges from about 3.0 to about 10.0 weight percent based on the total weight of the coating composition.

34. The composition of claim 33 which further comprises a flash rust inhibitor selected from the group consisting of tertiary alkanol amines of the formula

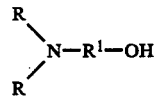

wherein each R is independently a hydrocarbyl group of one to about eight carbon atoms or a hydroxyl-substituted hydrocarbyl group of from about two to about eight carbon atoms and $R^1$ is a divalent hydrocarbyl group of from about two to about eighteen carbon atoms, said inhibitor ranging from 1.0 to about 3.0 weight percent based on the total weight of the composition.

35. A non-asphaltic, non-mastic coating composition comprising an effective amount of water and dispersed with said water (A) a film forming organic polymer selected from the group consisting of polyolefin resins, acrylic resins, polyester resins and polyurethanes, said organic polymer ranging from about 10.0 to about 65.0 weight percent based on the total weight of said compositions and (B) a non-Newtonian colloidal disperse system comprising (1) solid metal containing particles selected from the group consisting of alkali and alkaline earth metal salts, (2) a disperse medium selected from the group consisting of inert organic liquids and low molecular weight liquid polymers and (3) an organic compound selected from the group consisting of alkali and alkaline earth metal salts of oil soluble organic acids, said non-Newtonian colloidal disperse system ranging from 1.0 to about 20.0 weight percent based on the total weight of said composition, wherein said non-Newtonian colloidal disperse system is characterized by having a neutralization base number of about 7.0 or less.

36. A non-asphaltic, non-mastic type coating composition comprising an effective amount of water and dispersed within said water
(A) a film forming amount of a film forming organic polymer selected from the group consisting of styrene-containing polymers, and
(B) a non-Newtonian colloidal disperse system comprising (1) solid metal-containing colloidal particles, (2) a liquid dispersing agent, and (3) an organic compound, the molecules of which contain a hydrophobic portion and at least one polar substituent,
wherein said non-Newtonian colloidal disperse system is characterized by having a neutraization base number of about 7.0 or less and is present in an amount sufficient to inhibit rust formation on the substrate to which said coating composition is applied.

37. The composition of claim 36 wherein component (A) is a styrene-containing copolymer.

38. The composition of claim 36 wherein component (A) is a styrene containing terpolymer.

39. A non-asphaltic, non-mastic type coating composition consisting essentially of water and dispersed with said water
(A) a film forming amount of a film forming latex polymer, and
(B) a rush-inhibiting and thixotropic effective amount of a Non-Newtonian colloidal disperse system comprising (1) solid metal containing colloidal particles, (2) a liquid dispersing agent and (3) an organic compound the molecules of which contain a hydrophobic portion and at least one polar substituent, wherein said non-Newtonian colloidal disperse system is characterized by having a neutralization base number of about 7 or less.

40. The composition of claim 39 wherein component (A) is a styrene-containing polymer.

41. The composition of claim 39 wherein component (A) is a styrene-containing copolymer.

42. The composition of claim 39 wherein component (A) is a styrene-containing terpolymer.

43. A coating composition consisting essentially of water and dispersed within said water
(A) A film forming amount of a film forming organic polymer and
(B) a non-Newtonian colloidal disperse system comprising (1) solid metal containing colloidal particles, (2) a liquid dispersing agent and (3) an organic compound the molecules of which contain a hydrophobic portion and at least one polar substituent,
wherein said non-Newtonian colloidal disperse system is characterized by having a neutralization base number of about 7.0 or less and is present in an amount sufficient to inhibit rust formation on the substrate to which said coating composition is applied.

44. The composition of claim 43 wherein said film forming organic polymer (A) ranges from about 10.0 to about 65.0 weight percent and the non-Newtonian colloidal disperse system (B) ranges from 1.0 to about 20.0 weight percent said percentages based on the total weight of the composition.

45. The composition of claim 44 wherein the film forming organic polymer (A) is an organic polymer selected from the group consisting of polyolefin resins, acrylic resins, polyester resins and polyurethanes and wherein the non-Newtonian colloidal disperse system comprises (1) solid metal containing particles selected from the group consisting of alkali and alkaline earth metal salts, (2) a disperse medium selected from the group consisting of inert organic liquids and low molecular weight liquid polymers and (3) an organic compound selected from the group consisting of alkali and alkaline earth metal salts of oil soluble organic acids.

46. The composition of claim 43 which further comprise (C) a plasticizer and (D) a coalescing agent wherein said compositions the plasticizer (C) ranges from 0 to about 15.0 weight percent and the coalescing agent (D) ranges from 0 to about 20.0 weight percent said percentages based on the total weight of the composition.

47. The composition of claim 43 which further comprises at least one flash rust inhibitor which ranges from 0.1 to about 3.0 weight percent based on the total weight of the composition.

48. A coating composition consisting essentially of water and dispersed within said water
(A) a film forming amount of a film forming water dispersed organic polymer in the form of disperse particles, wherein said polymer is an acrylic copolymer derived from mixtures of two or more ethylenically unsaturated monomers or at least one ethylenically unsaturated monomer and at least one vinyl double bond unsaturated monomer and
(B) a non-Newtonian colloidal disperse system comprising (1) solid metal-containing colloidal particles, (2) a liquid dispersing medium and (30 an organic compound, the molecules of which contain a hydrophobic portion and at least one polar substituent
wherein said non-Newtonian colloidal disperse system is characterized by having a neutralization base number of about 7.9 or less and is present in an amount sufficient to inhibit rust formation on the substrate to which said coating composition is applied.

49. The composition of claim 48 wherein said film forming water dispersed polymer (A), as solids, ranges from about 10.0 to about 65.0 weight percent and the non-Newtonian colloidal disperse system (B) ranges from about 1.0 to about 20.0 weight percent said percentages based on the total weight of the composition.

50. The composition of claim 48 wherein the water dispersed organic polymer (A) is an acrylic copolymer derived from a mixture of two or more ethylenically unsaturated monomers selected from the group consisting of lower $C_1$ to $C_4$ alkyl esters and amides of acrylic and methacrylic acids or derived from a mixture of at least one ethylenically unsaturated monomer selected from the group consisting of lower $C_1$ to $C_4$ alkyl esters and amides of acrylic and methacrylic acids and at least one vinyl double bond unsaturated monomer selected from the group consisting of styrene, ring substituted alkyl and alkyloxy styrene, alpha methyl styrene and ring substituted alkyl alpha methyl sytrene and wherein the non-Newtonian colloidal disperse system (B) comprises (1) solid metal containing particles selected from the group consisting of alkali and alkaline earth metal salts, (2) a disperse medium comprising a liquid petroleum fraction and (3) at least one organic component selected from the group consisting of alkali and alkaline earth metal salts of oil soluble organic acids said disperse system being characterized by having a neutralization base number about 5.0 or less and wherein the water dispersed polymer (A), as solids, ranges from about 15.0 to about 35.0 weight percent and the disperse system (B) ranges from about 10.0 to about 15.0 weight percent based on the total weight of the aqueous emulsion coating composition.

51. The composition of claim 50 wherein the water dispersed polymer (A) is an acrylic copolymer derived from a mixture of two or more ethylenically unsaturated monomers selected from the group consisting of lower $C_1$ to $C_4$ alkyl esters and amides of acrylic and methacrylic acids.

52. The composition of claim 51 wherein the ethylenically unsaturated monomers are the lower $C_1$ to $C_4$ alkyl esters of acrylic and methacrylic acid.

53. The composition of claim 50 wherein the water dispersed polymer (A) is an acrylic copolymer derived from a mixture of at least one ethylenically unsaturated monomer selected from the group consisting of the lower $C_1$ to $C_4$ alkyl esters and amides of acrylic and methacrylic acids and at least one vinyl double bond unsaturated monomer selected from the group consisting of styrene, ring substituted alkyl and alkyloxy styrene, alpha methyl styrene and ring substituted alkyl alpha methyl styrene.

54. The composition of claim 53 wherein the ethylenically unsaturated monomer is selected from the group consisting of $C_1$ to $C_4$ lower alkyl ester of acrylic and methacrylic acids.

55. The composition of claim 54 wherein the vinyl double bond unsubstituted monomer is selected from the group consisting of styrene, ring substituted alkyl styrene and alpha methyl styrene.

56. The composition of claim 50 wherein the solid metal containing particles are alkaline earth metal salts and the organic compound is an alkaline earth metal salt of an oil soluble organic acid.

57. The composition of claim 56 wherein the solid metal containing alkaline earth metal salts are selected from the group consisting of magnesium, calcium, strontium and barium carbonates.

58. The composition of claim 56 wherein the solid metal containing alkaline earth metal salts is selected from the group consisting of calcium and barium carbonates.

59. The composition of claim 57 wherein the alkaline earth metal salt of an oil soluble organic acid is selected from the group consisting of calcium and barium sulfonate and carboxylate.

60. The composition of claim 50 which further comprise (C) a plasticizer and (D) a coalescing agent wherein said composition the plasticizer (C) ranges from 0 to about 15.0 weight percent and the coalescing agent (D) ranges from 0 to about 20 weight percent said percentages based on the total weight of the coating composition.

61. The composition of claim 60 wherein the plasticizer (C) is selected from the group consisting of dialkyl adipates, dialkyl azelates, dialkyl sebacates, dialkyl phthalates, triaryl phosphates, alkyl aryl phosphates and polymeric polyesters and wherein the coalescing agent (D) is selected from the group consisting of alkylene glycols, alkylene glycol monoalkyl ethers and dialkylene glycol monoalkyl ethers.

62. The composition of claim 61 wherein the plasticizer (C) ranges from about 2.0 to about 7.0 weight percent and the coalescing agent (D) ranges from about 3.0 to about 10.0 weight percent based on the total weight of the coating composition.

63. The composition of claim 62 wherein the plasticizer (C) is a dialkyl adipate and the coalescing agent (D) is an alkylene glycol.

64. The composition of claim 60 which further comprises at least one flash rust inhibitor which ranges from 1.0 to 3.0 weight percent based on the total weight of the composition.

65. The composition of claim 64 wherein the flash rust inhibitor comprises at least one N-(hydroxy-substituted hydrocarbyl)amine.

* * * * *

UNITED STATES PATENT AND TRADEMARK OFFICE
CERTIFICATE OF CORRECTION

PATENT NO. : 4,629,753

DATED : December 16, 1986

INVENTOR(S) : Robert Edwin Quinn

It is certified that error appears in the above-identified patent and that said Letters Patent is hereby corrected as shown below:

Cover page, at the end of the second line of text in item [63], after "abandoned" insert --, which is a continuation of Ser. No. 322,325, Nov. 18, 1981, abandoned --.

Column 1, line 7, after "abandoned" insert --, which is a continuation of U.S. Ser. No. 322,325, filed on November 18, 1981, now abandoned --.

Signed and Sealed this

Thirty-first Day of July, 1990

Attest:

HARRY F. MANBECK, JR.

*Attesting Officer*   *Commissioner of Patents and Trademarks*